United States Patent
Krum et al.

(10) Patent No.: US 6,351,344 B1
(45) Date of Patent: Feb. 26, 2002

(54) STIFFENED COVER FOR A HEAD DISC ASSEMBLY OF A DISC DRIVE

(75) Inventors: Richard Gene Krum, Edmond, OK (US); Alexander Wei Chang, Longmont, CO (US); David Diepersloot, Felton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/260,162

(22) Filed: Mar. 1, 1999

(51) Int. Cl.$^7$ .............................................. G11B 17/02
(52) U.S. Cl. .................................................. 360/97.01
(58) Field of Search .......................... 360/97.01, 97.02; 361/684, 685

(56) References Cited

U.S. PATENT DOCUMENTS

| | | | |
|---|---|---|---|
| 5,282,100 A | * 1/1994 | Tacklind et al. | 360/97.02 |
| 5,366,200 A | * 11/1994 | Scura | 248/632 |
| 5,483,400 A | * 1/1996 | Tsujino | 360/106 |
| 5,541,791 A | * 7/1996 | Yamasaki et al. | 360/105 |
| 5,596,461 A | * 1/1997 | Stefansky | 360/97.01 |
| 5,606,473 A | * 2/1997 | Forbord et al. | 360/97.01 |
| 5,677,811 A | * 10/1997 | Kuno et al. | 360/97.01 |
| 5,790,344 A | * 8/1998 | Allen | 360/97.02 |
| 5,875,067 A | * 2/1999 | Morris et al. | 360/97.01 |
| 5,886,851 A | * 3/1999 | Yamazaki et al. | 360/97.02 |
| 6,011,670 A | * 1/2000 | Balsley, Jr. et al. | 360/97.01 |
| 6,023,392 A | * 2/2000 | Kim | 360/97.01 |

OTHER PUBLICATIONS

Kenneth A. Liebler, Future Trends In Spindle Bearings For Disk Drives, *Data Storage,* Nov./Dec. 1999, pp. 37–40.
C. P. Roger Ku, Steve Parsoneault, and Hans Leuthold, Hydrodynamic Motors Trim Disk Drive Run Out, *Data Storage,* Jan. 1999, pp.27–32.

* cited by examiner

*Primary Examiner*—Brian E. Miller
(74) *Attorney, Agent, or Firm*—John B. Phillips; Merchant & Gould P.C.

(57) ABSTRACT

A top cover for disc drives having a hydrodynamic motor configured to prevent contact between the top cover and the motor. Embodiments of the instant invention include a housing having a top cover and a base, at least one data storage disc, at least one head capable of reading the data storage disc and a controller. The top cover includes a plurality of coupling sites, a first indented portion, a second indented portion and a raised portion, wherein at least two coupling sites are aligned such that a substantially linear path between the coupling sites crosses the second indented portion and the raised portion.

12 Claims, 5 Drawing Sheets

STIFFENED COVER FOR A HEAD DISC ASSEMBLY OF A DISC DRIVE

FIELD OF THE INVENTION

This invention is generally directed to the field of disc drive assemblies; more specifically, to disc drives utilizing hydrodynamic motors. In particular, this invention relates to a disc drive assembly having a stiffened top cover which is configured to minimize the risk of contact of the top cover with the hydrodynamic motor.

BACKGROUND OF THE INVENTION

Modern computers employ various forms of storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material on a stiff or hard surface, optical disc drives which employ recording discs that have optically readable recording material, magneto-optical (MO) disc drives which employ recording discs that have optically readable magnetizable recording material, or the like.

Conventional disc drive systems typically include one or more recording discs supported for relatively high speed rotation on a rotary spindle. For example, FIG. 1 shows a side view of portions of a conventional disc drive system, including a conventional data storage or recording disc 200 supported on a spindle 210. A disc drive motor (not shown) is operatively coupled to the spindle 210 for rotation of the spindle and the disc supported thereon. A recording and/or reading head 220 is supported by suitable head support structure (not shown) adjacent the recording surface of the disc. To simplify the disclosure, FIG. 1 is shown with a single recording disc 200 having a single recording surface and a single head 220. However, other conventional disc drive systems employ multiple discs, double-sided discs (discs with recording surfaces on both surfaces) and multiple heads.

As shown in FIG. 1, the disc 200 has a central hub opening through which the spindle 210 extends. The disc 200 and spindle 210 are shown in a top view in FIG. 2. The spindle 210 extends through a central opening, which defines an inside diameter, of the disc. The disc is secured at its inner diameter (ID), in a fixed relation with the spindle 210, and is supported such that the outer diameter (OD) portion of the disc is free from contact with other components. In this regard, the disc is clamped at its ID to the spindle 210 and is free at its OD. When the spindle 210 is rotatably driven, the disc 200 is cause to rotate with the spindle. In many cases a top (not shown) which provides a protective cover for the disc is attached through the top of the spindle 210.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly.

The surfaces of the stacked discs are accessed by the read/write heads which are mounted on a complementary stack of actuator arms which form a part of an actuator assembly. Generally, the actuator assembly has an actuator body that pivots about a pivot mechanism disposed in a medial portion thereof. A motor selectively positions a proximal end of the actuator body. This positioning of the proximal end in cooperation with the pivot mechanism causes a distal end of the actuator body, which supports the read/write heads, to move radially across the recording surfaces of the discs, such that the head may be selectively positioned adjacent any recording location on the recording surface of the disc, as the disc is rotated.

In operation, the head 220 is moved in the radial direction to align or register with a desired track location on the recording surface of the disc. Once aligned or registered with the desired track location, the head 220 is operated to read or write information onto the recording surface at the desired track location. It is important to properly register the head 220 with the track location to effect accurate reading or writing operations on the registered track.

Modern advances in disc drive technology have resulted in increased disc storage density and decreased track widths, such that greater amounts of information may be stored per given recording surface area. However, as track widths decrease (and storage density increases), the need for accurate head registration increases. In general, smaller track widths require greater head-to-track registration accuracies and have smaller alignment error tolerances. For example, for a disc with 393.7 tracks per mm (10,000 tracks per inch), the track width is only about 2540 $\mu$mm (100 $\mu$in) and the total allowable (tolerable) off-track mis-registration may be no more than about 254 $\mu$mm (10 $\mu$m) peak-to-peak.

Track mis-registration (TMR) may result from a variety of sources, including, for example, ball bearing non-repeatable run out, spindle-disc rocking vibrations and disc flutter. In some larger motor environments, hydrodynamic motors have been used to avoid or minimize the asynchronous vibrations caused by ball bearing non-repeatable run out and rocking vibration. Accordingly, the assignee of the present invention employs a hydrodynamic motor instead of the ball bearing motors previously used in disc drive systems.

Although the introduction of the hydrodynamic motor can reduce vibration problems associated with conventional disc drive systems, introduced other concerns have been raised. For instance, the hydrodynamic motors are not attached to the top cover by the spindle. In fact, the motor, when spinning, cannot be touched by the top cover or else there is a risk of the head crashing the disc. A need in the industry exists for a top cover or top section of the housing which will decrease the risk of interfering with the spinning disc and rotor during use, for example, due to unforeseen, or foreseen, forces exerted on the top cover of the disc drive housing such that it depresses into the spinning disc. A force, for example, created by a person handling the disk drive.

SUMMARY OF THE DISCLOSURE

Preferred embodiments of the instant invention are directed to a system apparatus and method involving a stiffened housing that for improved protection of a spinning rotor of a hydrodynamic motor and decreases the likelihood that the disc will fail due to interference with the operation of the motor. Preferred embodiments include a housing, a data storage disc, a head-arm assembly, which resides adjacent the data storage disc, and a controller, wherein the housing includes a base section and a top section which connect together to form an enclosure for further components of the disc drive apparatus, including the data storage disc (or disc stack). The data storage disc (or disc stack) is driven by a hydrodynamic motor that is disposed in the center of the disc.

The top section of the housing further includes a top surface and a plurality of side walls, wherein the top surface includes a first indented portion, a second indented portion, a raised portion and a plurality of coupling sites. The first and second indented portions are formed within the material of the top section and increase the stiffness of the top section by confining and minimizing the area of the top surface that will be distorted or bent when a force is applied thereto.

The raised portion of the top surface is disposed adjacent (directly above) the motor and helps prevent the top surface from contacting the motor. Similar to the first and second indented portions, the raised portion increases the strength of the top by minimizing the ability of the material of the top section to bend between the contours of the indented and raised portions.

To further minimize the distortion area, coupling sites are disposed on the top. The sites are located to maximize the lines of strength, which further increases the stiffness of the top section of the housing.

The indented portions and locations thereof on the top section of the housing are features of embodiments of this invention. These features provide a number of advantages, including minimization and confinement of the area of distortion or bending. A further advantage of these features is that the minimization of the distortion area allows for the maintenance of the integrity of the material forming the top.

As a further feature of embodiments of this invention, the load or strength lines formed in the top section are located to cross a portion of the motor. An advantage of this feature is that the placement of the load lines decreases the likelihood that the top surface will be depressed into contact with the motor during operation.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of preferred embodiments of the invention will be made with reference to the accompanying drawings, wherein like numerals designate corresponding parts in the figures.

DETAILED DESCRIPTION OF THE PREFERRED EMBODIMENTS

Figure 1:
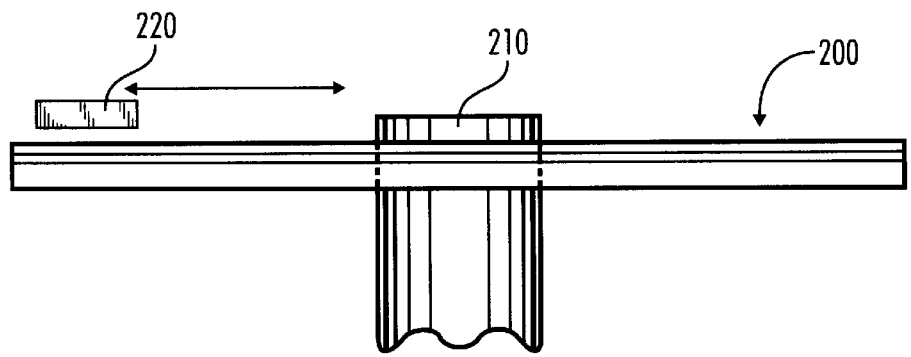
FIG. 1 is a side view of portions of a conventional disc drive system and recording disc.
Figure 2:
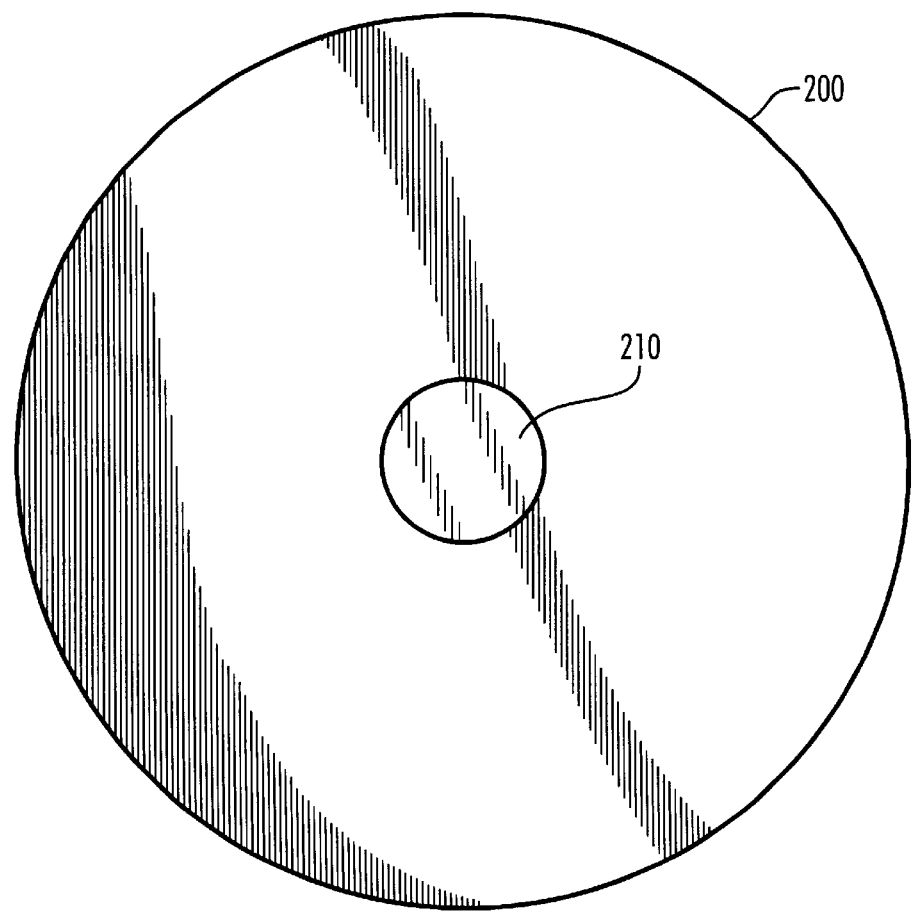
FIG. 2 is a top view of the recording disc and spindle of the system shown in FIG. 1.
Figure 3:
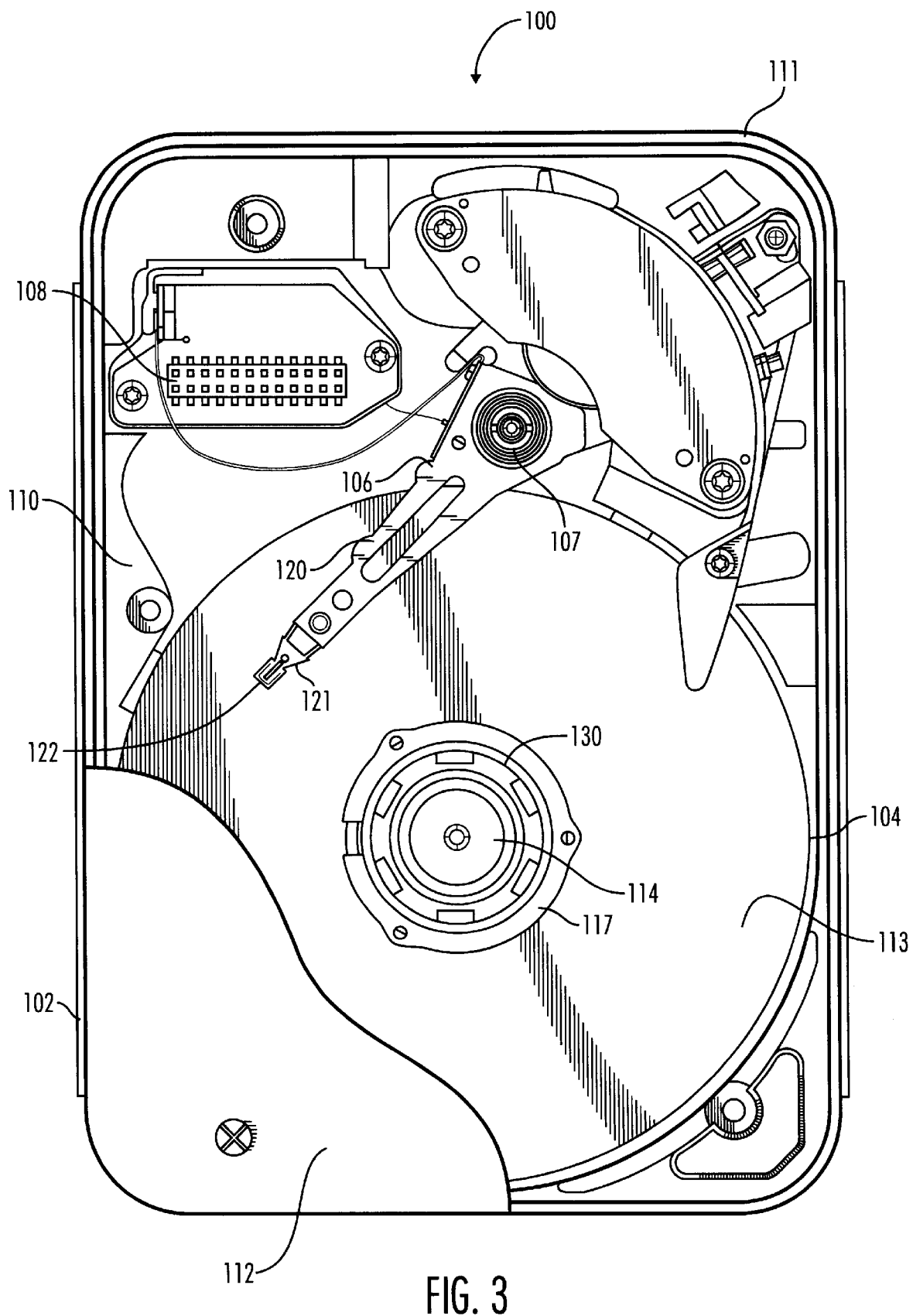
FIG. 3 is a top view of a preferred embodiment of a disc drive assembly.

FIG. 3 depicts an overview of a preferred embodiment of a disc drive apparatus 100 of the instant invention. With reference to FIG. 3, the disc drive apparatus 100 includes a housing 102 (partially shown), a data storage disc 104, head-arm assembly 106 which resides adjacent the data storage disc 104 and a controller 108 (partially shown). FIG. 3 is a top plan view of the disc drive apparatus 100, wherein a top portion of the apparatus 100 has been cut-away to expose the head-arm assembly 106 positioned over the data storage disc 104. It will be understood that numerous details of construction of the disc drive 100 are not included in the following description, as such, they are well known to those skilled in the art and are believed to be unnecessary for the purpose of describing the present invention.

The housing 102 includes a base 110 and a top 112, wherein the base 110 is configured to support the data storage disc 104 and the head-arm assembly 106. The top 112, coupled with the base 110 and a perimeter gasket 111, provide a sealed internal environment for the disc drive 100.

The data storage disc 104 includes a recording surface 113 which is divided into concentric circular data tracks (not shown). Alternatively, the recording surface 113 may define a cylindrical track configuration. The recording surface 113 is capable of receiving and storing information for later use.

A spindle motor 114, encased by a hub 130, is mounted to the base 110. The data storage discs 104, which are centered open discs, are mounted around the hub 130 and secured by a clamp and balance ring 117 for rotation at a constant speed. Typically, the motor 114 is capable of spinning between 7200 to at least 20,000 rpms.

Adjacent the disc 104 is a head-arm assembly 106 which pivots on a pivot spindle assembly 107. The head-arm assembly 106 includes an arm 120, a suspension member 121 and a read/write head 122, wherein the head 122 is positioned over the data storage disc 104 at one end of the suspension member 121. The suspension member 121 can be moved across the recording surface 113 of the disc 104, thereby allowing the head 122 to be moved across the face 113 such that the information on the disc 104 can be read.

A plurality of storage discs 104 may be arranged in a stack, supported on the motor 114. A plurality of heads are supported on a head-arm assembly 106 in an E-block structure, to access the discs 104 simultaneously, wherein each head accesses one of two surfaces (top and bottom) of each disc 104.

The movement of the head-arm assembly 106 is controlled by the controller 108. The controller 108 is coupled to the base 110 and is in electronic communication with further components of the disc drive apparatus 100. The controller 108 comprises any suitable means capable of controlling the components of the disc drive, such as, the motor 114 and the head-arm assembly 106. In one preferred embodiment, the controller is an integrated circuit board.

One embodiment of the instant invention is more specifically directed to the housing 102 of the disc drive apparatus 100. As stated above, the housing 102 includes a base section 110 and a top section 112 which, when coupled together, form an enclosure for the interior components of the disc drive apparatus 100.

Figure 4:
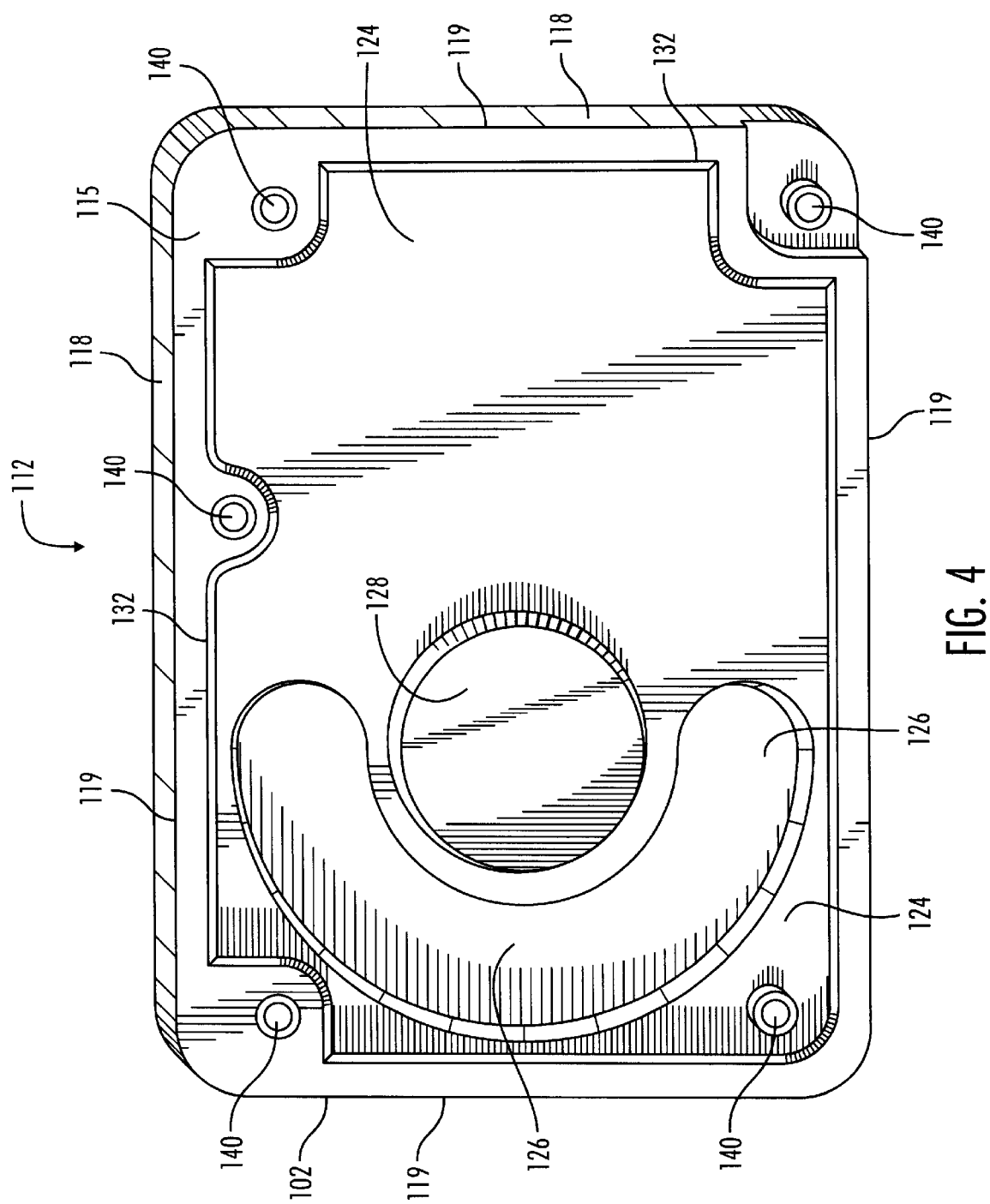
FIG. 4 is a brief embodiment of a top cover.

With reference to FIG. 4, the top 112 includes a top surface 115 and a plurality of side walls 118. The top surface 115 further includes a first indented portion 124, a second indented portion 126, a raised portion 128 and a plurality of coupling sites 140. The top surface 115 can be configured to any suitable dimensions. In one preferred embodiment, the top surface 115 is 14.55 cm (5.73 inches) long×10.08 cm (3.97 inches) wide.

The side walls 118 extend substantially perpendicularly from the top surface 115, to define a perimeter 119. The side walls 118 are configured to mate with the base section 110 of the housing section 102 such that the top section 112 and base section 110 house further disc drive components.

Typically, the top 112 is rectangular in shape, although any shape capable of conforming to the configuration of the components to be protected is suitable. The top 112 is made from stainless steel or aluminum, although any material capable of sufficient rigidity. In preferred embodiments the top section 112 is made as a single unitary piece, for example, shaped by forming, molding, casting or machining process.

Figure 5:
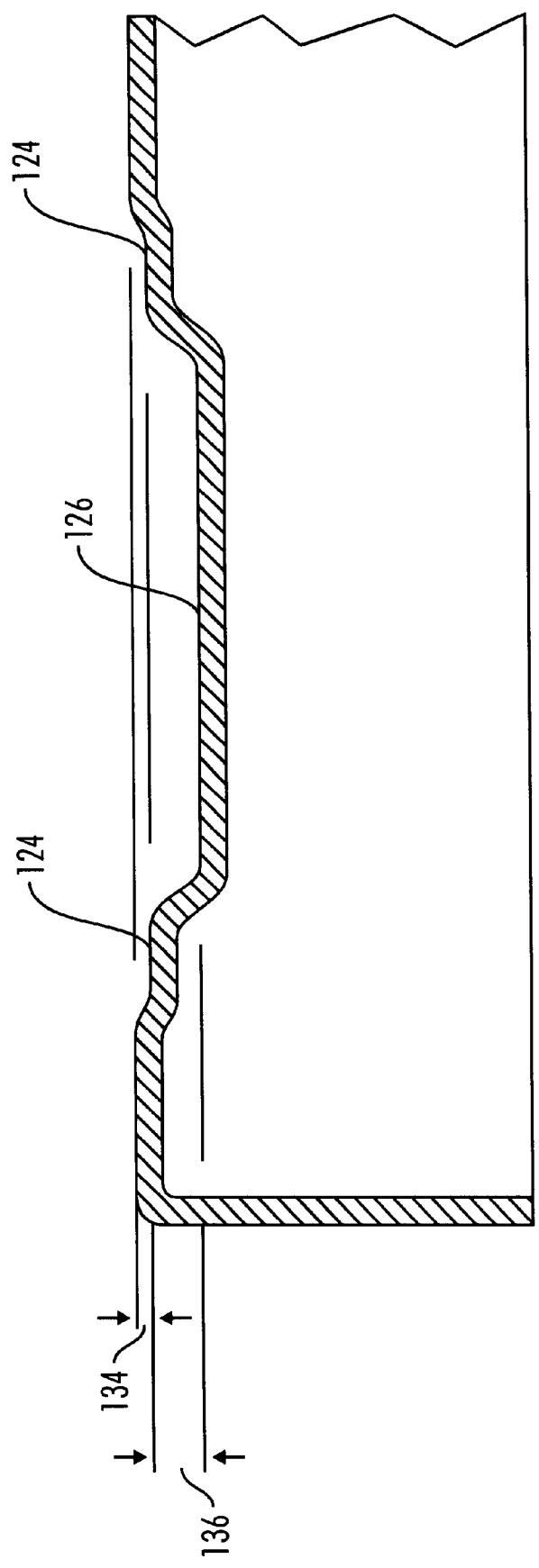
FIG. 5 is a cross section of the first and second indented portions.

The first and second indented portions 124, 126 and the raised portion 128 are all formed within the material composing the top section 112. With reference to FIG. 5, the first indented portion 124 is depressed to a first depression depth 134. In one preferred embodiment, the first depression 134 depth is between 0.31 mm (0.012 inches) and 0.46 mm (0.018 inches). The first indented portion 124 includes an outer boundary 132 and can form any suitable shape. For instance, as shown in FIG. 4, the boundary 132 curves in front of and behind the coupling sites 140. The boundary 132 of the first indented member 124 resides inward from the perimeter 119 and forms an interior border within the top surface 115. However, in some preferred embodiments, the boundary 132 of the first indented portion 124 is the same as the perimeter 119 of the top surface 115.

With reference again to FIG. 5, the second indented portion 126 is depressed to a second depression depth 136. In one preferred embodiment, the second depression depth 136 is between 1.45 mm (0.057 inches) and 1.57 mm (0.062 inches) as measured from the bottom of the first indented portion. Preferably, the second depression depth 136 is deeper than the first depression depth 134.

Although the second indented portion 126 can be formed in virtually any shape, an appropriate shape is dictated, in part, by the amount of contour or edge prescribed by the particular shape. The rigidity of the top section 112 is dependent, in part, on the amount of contour or edge of the indentation shape. Generally, a larger total perimeter edge (total of all discontinuous indentation shapes combined) will result in lesser rigidity to the overall top surface. Thus, a single, contiguous shape generally has less edge than shapes with discontinuous edges and aids in the prevention of bending throughout the indented area. For instance, with reference to FIG. 4, the second indented portion 126 defines a horseshoe or "U" shape, wherein the horseshoe or "U" shape allows for a higher amount of rigidity as the shape maintains a continuous radius.

Figure 6:
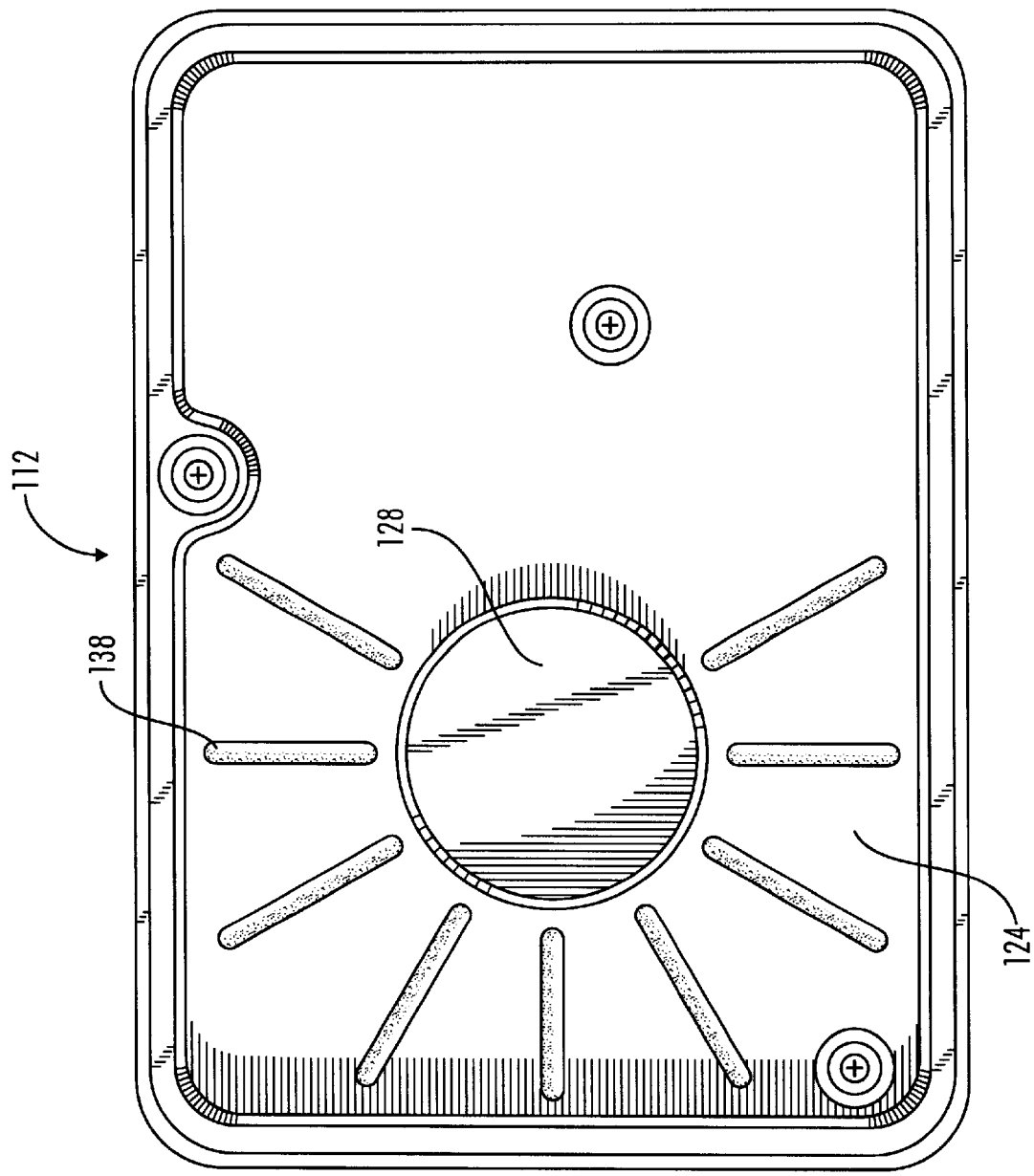
FIG. 6 is a preferred embodiment of a second indent member having a rib shape.

In some preferred embodiments, less rigidity is desired. To reduce rigidity, discontinuous edge shapes are used. For example, FIG. 6 illustrates an embodiment utilizing a rib pattern 138. Shapes having discontinuous edges provide for more localized rigidity, although, as stated, less rigidity than shapes having continuous edges. Further, discontinuous edge shapes allow for more bending between the discontinuous sections of the overall shape. Thus, a determination of the appropriate shape is dependent, in part, by the amount of rigidity desired.

To aid in preventing the top 115 from coming in contact with motor 114, a raised portion 128 is placed directly above the motor 114. The raised portion 128 is higher than either the first indented portion 124 or the second indented portion 126. By raising the section of top 115 over the motor 114, the area over the motor 114 is stiffened such that bending of the material due to applied forces tends to occur at the edge or contour of the raised portion 128 as opposed to the center of the raised portion 128 which is disposed over the motor 114. In one preferred embodiment, the raised portion 128 is 0.38 mm (0.015 inches) high. In one preferred embodiment, the raised portion 128 is circular in shape, although any shape that conforms to the shape of the component, or expands the area over the component desired to be protected, is suitable.

To further enhance the rigidity of the top section 115, and with reference to FIG. 4, a plurality of coupling sites 140 are positioned in various locations on the top section 115. The sites 140 are positioned such that at least two of the sites 140 create a load line or line of rigidity 132 that crosses a portion of the head of the motor 114. These load lines 132, contribute to the rigidity of the top section 115 such that the motor 114, when spinning, is protected from being contacted by the top section 115.

In one preferred embodiment, the coupling sites 140 are created by indenting the top section 115. The sites 140 allow the passage of a screw, clip or other coupler such that the top section 115 and the base 110 can be secured together. However, other coupling techniques are also suitable, such as, for example, taping, preferably, as long as the coupling occurs at the predesignated sites 140. It is to be understood that these coupling sites 140 are at least partially depending upon the placement of the disc drive components on the base 110 and, thus, could be at different positions relative to the top section for different arrangements of the disc drive components.

Accordingly, based on the above description, a preferred embodiment of a disc drive apparatus includes a housing having a base section and a top section. The top section of the housing further includes a plurality of coupling points, a first indented portion, a second indented portion, and a raised portion, wherein the second indented portion forms an are and a section of the raised portion resides within the radius of the arc. The coupling sites are locations where the base and top are connected. At least two coupling sites are aligned such that a substantially linear path between the coupling points crosses the second indented portion and the raised portion. The disc drive apparatus further includes at least one data storage disc that resides within the base of the housing, at least one head that resides adjacent the data storage disc and is capable of reading the data storage disc, and a controller, wherein the controller is coupled to the head.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive assembly while maintaining substantially the same functionality without department from the scope and spirit of the present invention. In addition, although the preferred embodiment described herein is directed to a top cover for the disc drive system, it will be appreciated by those skilled in the art that the teachings of the present invention can be applied to other systems without departing from the scope and spirit of the present invention.

What is claimed is:

1. A disc drive comprising:
  a base plate supporting a drive motor carrying a data disc; and
  a stiffened cover attached to the base plate to enclose the disc drive, the stiffened cover including a top surface and a plurality of sidewalls extending from a perimeter of the top surface, the top surface including a first indented portion defining an outer boundary extending inward from the perimeter of the top surface and extending a first distance below the perimeter of the top surface, a second indented portion within the outer boundary of the first indented portion and extending downward from the first indented portion a second distance below the first indented portion, and a raised portion with the outer boundary of the first indented portion and extending upward from the first indented portion a third distance above the first indented portion, the raised portion covering the drive motor to provide additional clearance for the drive motor.

2. A disc drive as defined in claim 1, wherein:

the raised portion is circular in shape; and the second indented portion defines a semi-circular crescent shape that is substantially centered about a center point of the circular raised portion.

3. A disc drive as defined in claim 2, wherein:

the base plate supports an actuator assembly adjacent the data disc for positioning a head over a first portion of the data disc;

the first distance is selected to provide sufficient clearance between the first indented portion and the actuator assembly; and the second indented portion is positioned over a second portion of the data disc that is not accessed by the head of the actuator assembly.

4. A disc drive as defined in claim 2, wherein the second distance is greater than the first distance.

5. A disc drive as defined in claim 2, wherein the third distance is greater than the first distance.

6. A disc drive as defined in claim 2, wherein the third distance is not greater than the first distance.

7. A stiffened cover for a disc drive having a base plate supporting a drive motor carrying a data disc, the stiffened cover adapted to be secured to the base plate to enclose the disc drive, the stiffened cover comprising:

a top surface defining a perimeter;

a plurality of sidewalls extending downward from the perimeter of the top surface;

a first indented portion extending downward from the top surface a first distance below the perimeter, the first indented portion defining an outer boundary extending inward from the perimeter of the top surface;

a second indented portion within the outer boundary of the first indented portion and extending downward from the first indented portion a second distance below the first indented portion; and a raised portion within the outer boundary of the first indented portion and extending upward from the first indented portion a third distance above the first indented portion, the raised portion positioned to cover the drive motor to provide additional clearance for the drive motor when the stiffened cover is secured to the base plate.

8. A stiffened cover as defined in claim 7, wherein:

the raised portion is circular in shape; and the second indented portion defines a semi-circular crescent shape that is substantially centered about a center point of the circular raised portion.

9. A stiffened cover as defined in claim 8, wherein the base plate of the disc drive supports an actuator assembly adjacent the data disc for positioning a head over a first portion of the data disc, and wherein:

the first distance is selected to provide sufficient clearance between the first indented portion and the actuator assembly when the stiffened cover is secured to the base plate; and the second indented portion is positioned to cover a second portion of the data disc when e stiffened cover is secured to the base plate, wherein the first and second portions of the data disc do not overlap.

10. A stiffened cover as defined in claim 8, wherein the second distance is greater than the first distance.

11. A stiffened cover as defined in claim 8, wherein the third distance is greater than the first distance.

12. A stiffened cover as defined in claim 8, wherein the third distance is not greater than the first distance.

* * * * *

UNITED STATES PATENT AND TRADEMARK OFFICE
CERTIFICATE OF CORRECTION

PATENT NO. : 6,351,344 B1  Page 1 of 1
DATED : February 26, 2002
INVENTOR(S) : Krum et al.

It is certified that error appears in the above-identified patent and that said Letters Patent is hereby corrected as shown below:

Column 1,
Line 19, "hard" should be deleted.

Column 6,
Line 31, replace "are" with -- arc --.

Column 7,
Line 10, replace "with" with -- within --.

Column 8,
Line 31, replace "e" with -- the --.

Signed and Sealed this

Second Day of July, 2002

Attest:

Attesting Officer

JAMES E. ROGAN
Director of the United States Patent and Trademark Office